United States Patent
Xue

(10) Patent No.: US 11,914,551 B2
(45) Date of Patent: Feb. 27, 2024

(54) PRE-READING METHOD AND SYSTEM OF KERNEL CLIENT, AND COMPUTER-READABLE STORAGE MEDIUM

(71) Applicant: INSPUR SUZHOU INTELLIGENT TECHNOLOGY CO., LTD., Jiangsu (CN)

(72) Inventor: Yamao Xue, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/271,458

(22) PCT Filed: Nov. 30, 2021

(86) PCT No.: PCT/CN2021/134337
§ 371 (c)(1),
(2) Date: Jul. 9, 2023

(87) PCT Pub. No.: WO2023/015778
PCT Pub. Date: Feb. 16, 2023

(65) Prior Publication Data
US 2024/0037070 A1    Feb. 1, 2024

(30) Foreign Application Priority Data
Aug. 13, 2021 (CN) .......................... 202110928210.7

(51) Int. Cl.
G06F 16/172 (2019.01)
G06F 16/901 (2019.01)

(52) U.S. Cl.
CPC ........ G06F 16/172 (2019.01); G06F 16/9024 (2019.01)

(58) Field of Classification Search
CPC .......................... G06F 16/172; G06F 16/9024
(Continued)

(56) References Cited

U.S. PATENT DOCUMENTS 7,711,797 B1 * 5/2010 Huang ................ H04L 67/5681
710/36
2003/0074525 A1 * 4/2003 Yamauchi ............. G06F 12/121
711/E12.07
(Continued)

FOREIGN PATENT DOCUMENTS

CN    105094701 A    11/2015
CN    106951301 A    7/2017
(Continued)

Primary Examiner — Christopher B Shin
(74) Attorney, Agent, or Firm — IPro, PLLC

(57) ABSTRACT

The present application discloses a pre-reading method and system of a kernel client, and a computer-readable storage medium. The method includes: receiving a reading request for a file and determining whether the reading of the file is continuous; if the reading of the file is discontinuous, generating a head node of a file inode, and constructing a linked list embedded in the head node; determining whether the file includes a reading rule for the file, and if the file includes the reading rule for the file, acquiring, based on the reading rule, the number of reading requests for the file and a reading offset corresponding to each request, generating a map route based on the number of reading requests and corresponding reading offsets, and storing the map route in the linked list; and executing pre-reading based on the linked list.

20 Claims, 2 Drawing Sheets

(58) Field of Classification Search
USPC .......................................................... 711/118
See application file for complete search history.

(56) References Cited

U.S. PATENT DOCUMENTS

| | | | |
|---|---|---|---|
| 2003/0115410 A1* | 6/2003 | Shriver | G06F 16/182 |
| | | | 714/E11.198 |
| 2005/0205814 A1 | 9/2005 | Yamaguchi | |
| 2010/0312974 A1* | 12/2010 | Kikuchi | G11B 27/34 |
| | | | 711/E12.001 |
| 2012/0150924 A1* | 6/2012 | Lee | G06F 3/067 |
| | | | 707/821 |
| 2015/0169621 A1* | 6/2015 | Ouyang | G06F 16/1827 |
| | | | 707/827 |
| 2015/0242437 A1* | 8/2015 | Lee | G06F 16/182 |
| | | | 707/827 |
| 2017/0116127 A1 | 4/2017 | Roush | |
| 2020/0319817 A1* | 10/2020 | Matsubara | G06F 3/0653 |

FOREIGN PATENT DOCUMENTS

| | | | |
|---|---|---|---|
| CN | 111625503 A | 9/2020 | |
| CN | 113377725 A | 9/2021 | |
| JP | 2017215096 A | 12/2017 | |

* cited by examiner

PRE-READING METHOD AND SYSTEM OF KERNEL CLIENT, AND COMPUTER-READABLE STORAGE MEDIUM

CROSS-REFERENCE TO RELATED APPLICATION

The present disclosure claims the priority of the Chinese patent application filed on Aug. 13, 2021 before the China National Intellectual Property Administration with the application number of 202110928210.7 and the title of "PRE-READING METHOD AND SYSTEM OF KERNEL CLIENT, AND COMPUTER-READABLE STORAGE MEDIUM", which is incorporated herein in its entirety by reference.

FIELD

The present disclosure relates to the technical field of computer and, more particularly, to a method for pre-reading a kernel client, a system and a computer-readable storage medium.

BACKGROUND

With the advent of an era of social information explosion, the amount of information data is increasing day by day, the development of storage servers is getting faster and faster, and performance requirements of customers for reading and writing of storage are higher and higher. When reading files from the storage, there are great advantages to use a kernel client, thanks to caching features (page cache and pre-reading, etc.) of the kernel and shorter IO paths. The kernel pre-reading is to read more of a certain amount of pages in order after the amount of the reading requests is read, so that when the next reading request is read, the target content may be directly read in the cache. However, when random reading is performed in some customer scenarios, the kernel client recognizes the random reading, and the pre-reading may stop and be disabled.

SUMMARY

In view of this, the present disclosure provides a method for pre-reading a kernel client, a system and a computer-readable storage medium. The pre-reading mechanism of the kernel client is improved, the non-sequential pre-reading of the kernel client is realized, the file reading performance of the kernel client is improved, and various forms of file reading business may be adapted to, and a cache hit rate of non-sequential pre-reading is improved.

Based on the object stated above, in an aspect, the embodiments of the present disclosure provide a method for pre-reading a kernel client, including the steps as follows:
receiving a reading request for a file and determining whether reading for the file is continuous;
when the reading for the file is discontinuous, generating a head node of a file mode, and constructing a linked list embedded in the head node, each linked list node in the linked list including a reading offset;
determining whether the file includes a reading rule of the file, and when the file includes the reading rule of the file, obtaining, based on the reading rule, times of the reading request of the file and the reading offset corresponding to each time of the reading request, and generating a map route based on the times of the reading request and corresponding reading offsets, and storing the map route in the linked list; and
executing pre-reading based on the linked list.

In some embodiments, the method further includes:
when the file does not include the reading rule of the file, determining whether to read the file repeatedly, and based on a determination result, obtaining the times of the reading request of the file and the reading offsets corresponding to each time of the reading request, and generating the map route based on the times of the reading request and the reading offset corresponding to each time of the reading request, and storing the map route in the linked list.

In some embodiments, determining whether to read the file repeatedly, and based on the determination result, obtaining the times of the reading request of the file and the reading offset corresponding to each time of the reading request, and generating the map route based on the times of the reading request and the reading offset corresponding to each time of the reading request includes:
in response to reading the file repeatedly, obtaining the times of the reading request of the file and the corresponding reading offsets when the file is read for a first time, and when the file is repeatedly read, based on the times of the reading request, making a difference calculation to the corresponding reading offsets, respectively, and when an error of a calculating result is less than a preset quantity of pages, generating the map route based on that the error of the calculating result is less than a preset quantity of the corresponding reading offsets.

In some embodiments, determining whether to read the file repeatedly, and based on the determination result, obtaining the times of the reading request of the file and the reading offset corresponding to each time of the reading request, and generating the map route based on the times of the reading request and the reading offset corresponding to each time of the reading request includes:
when it is not performed repeatedly reading the file, obtaining preset times of the reading request of the file and the reading offset corresponding to each time of the reading request, and based on the preset times of the reading request and the corresponding reading offsets, performing statistical calculation and generating the map route.

In some embodiments, performing the statistical calculation based on the preset times of the reading request and the corresponding reading offsets, and generating the map route includes:
based on the preset times and the corresponding reading offsets, obtaining an average value of the reading offsets;
based on an average value of the reading offsets and a size of the file, obtaining requesting times of an unread part of the file; and
based on the requesting times of the unread part of the file and the average value of the reading offsets, generating the map route.

In some embodiments, receiving the reading request for the file and determining whether the reading for the file is continuous further includes: recording discontinuous times of reading the file.

In some embodiments, the reading for the file is discontinuous includes: the discontinuous times reaches preset times.

In some embodiments, each linked list node in the linked list further includes the reading offset to be read in the next time; and
executing pre-reading based on the linked list includes:
based on the linked list, reading the reading offset to be read in the next time of the file into a page high-speed cache to execute pre-reading a file that is not read sequentially.

In another aspect, the embodiments of the present disclosure further provide a system for pre-reading a kernel client, including:
a receiving module configured for receiving a reading request for a file and determining whether reading for the file is continuous;
a constructing module configured for, when the reading for the file is discontinuous, generating a head node of a file mode, and constructing a linked list embedded in the head node, each linked list node in the linked list includes a reading offset;
a generating module configured for determining whether the file includes a reading rule of the file, and when the file includes the reading rule of the file, obtaining, based on the reading rule, times of the reading request of the file and the reading offset corresponding to each time of the reading request, and generating a map route based on the times of the reading request and corresponding reading offsets, and storing the map route in the linked list; and
an executing module configured for executing pre-reading based on the linked list.

In some embodiments, the system further includes a second generating module configured for:
when the file does not include the reading rule of the file, determining whether to read the file repeatedly, and based on a determination result, obtaining the times of the reading request of the file and the reading offsets corresponding to each time of the reading request, and generating the map route based on the times of the reading request and the reading offset corresponding to each time of the reading request, and storing the map route in the linked list.

In some embodiments, determining whether to read the file repeatedly, and based on the determination result, obtaining the times of the reading request of the file and the reading offset corresponding to each time of the reading request, and generating the map route based on the times of the reading request and the reading offset corresponding to each time of the reading request includes:
in response to reading the file repeatedly, obtaining the times of the reading request of the file and the corresponding reading offsets when the file is read for a first time, and when the file is repeatedly read, based on the times of the reading request, making a difference calculation to the corresponding reading offsets, respectively, and when an error of a calculating result is less than a preset quantity of pages, generating the map route based on that the error of the calculating result is less than a preset quantity of the corresponding reading offsets.

In some embodiments, determining whether to read the file repeatedly, and based on the determination result, obtaining the times of the reading request of the file and the reading offset corresponding to each time of the reading request, and generating the map route based on the times of the reading request and the reading offset corresponding to each time of the reading request includes:
when it is not performed repeatedly reading the file, obtaining preset times of the reading request of the file and the reading offset corresponding to each time of the reading request, and based on the preset times of the reading request and the corresponding reading offsets, performing statistical calculation and generating the map route.

In some embodiments, performing the statistical calculation based on the preset times of the reading request and the corresponding reading offsets, and generating the map route includes:
based on the preset times and the corresponding reading offsets, obtaining an average value of the reading offsets;
based on an average value of the reading offsets and a size of the file, obtaining requesting times of an unread part of the file; and
based on the requesting times of the unread part of the file and the average value of the reading offsets, generating the map route.

In some embodiments, receiving the reading request for the file and determining whether the reading for the file is continuous further includes: recording discontinuous times of reading the file.

In some embodiments, the reading for the file is discontinuous includes: the discontinuous times reaches preset times.

In some embodiments, each linked list node in the linked list further includes the reading offset to be read in the next time; and
executing pre-reading based on the linked list includes:
based on the linked list, reading the reading offset to be read in the next time of the file into a page high-speed cache to execute pre-reading a file that is not read sequentially.

In yet another aspect, the embodiments of the present disclosure further provide a computer-readable storage medium storing a computer program, wherein the computer program, when executed by a processor, implements the steps of the method stated above.

The present disclosure has the beneficial effects as follows: by using the solution of the present disclosure, the pre-reading mechanism of the kernel client is improved, the non-sequential pre-reading of the kernel client is realized, the file reading performance of the kernel client is improved, and various forms of file reading business may be adapted to, and a cache hit rate of non-sequential pre-reading is improved.

BRIEF DESCRIPTION OF THE DRAWINGS

In order to explain the embodiments of the present disclosure or the technical solutions in the prior art more clearly, a brief description may be given below with reference to the accompanying drawings which are used in the description of the embodiments or the prior art, and it is obvious that the drawings in the description below are merely some embodiments of the present disclosure, and a person skilled in the art may obtain other embodiments according to these drawings without involving any inventive effort.

DETAILED DESCRIPTION

For clearer descriptions of the objectives, technical solutions, and advantages of the present disclosure, embodiments of the present disclosure are described hereinafter in detail with reference to embodiments and the accompanying drawings.

It should be noted that all expressions using "first" and "second" in the embodiments of the present disclosure are intended to distinguish two different entities or parameters with the same name. It may be seen that "first" and "second" are merely for the convenience of expressions and should not be construed as limiting the embodiments of the present disclosure, which may not be stated one by one in subsequent embodiments.

Figure 1:
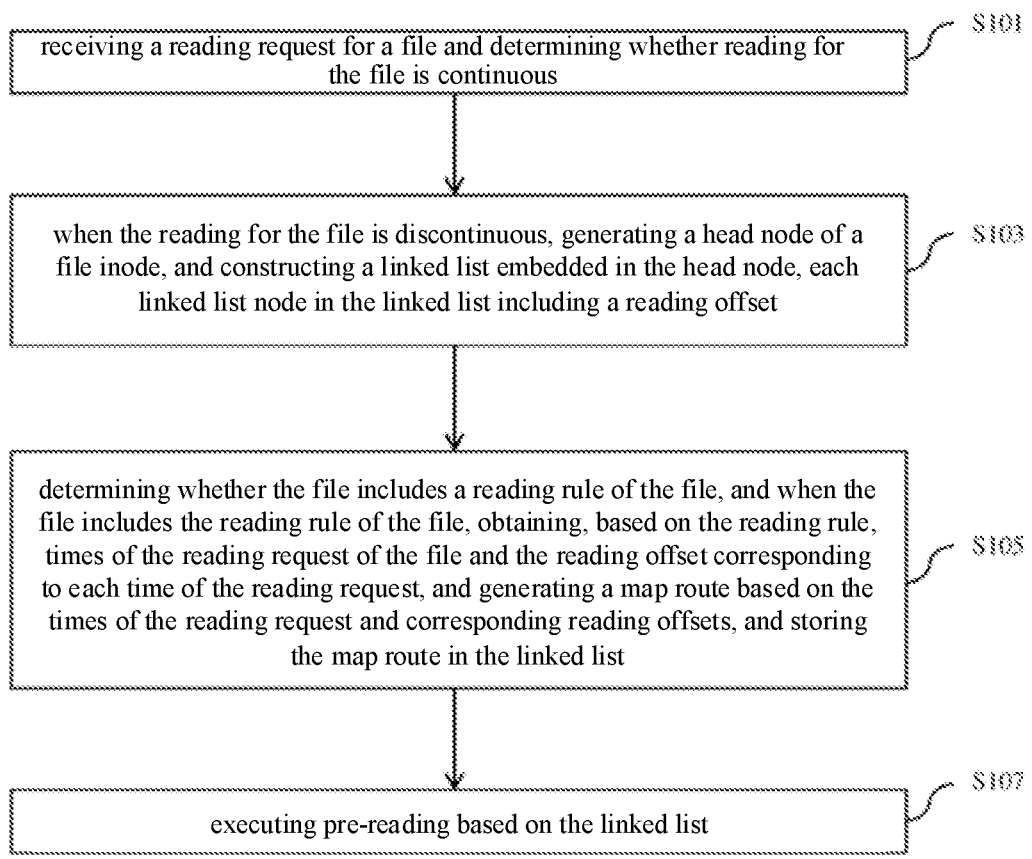
FIG. 1 is a block diagram of a method for reading a kernel client according to an embodiment of the present disclosure.

Based on the object stated above, in a first aspect, the embodiments of the present disclosure provide a method for pre-reading a kernel client. As shown in FIG. 1, the method includes the steps as follows:

Step 101, receiving a reading request for a file and determining whether reading for the file is continuous;

Step 103, when the reading for the file is discontinuous, generating a head node of a file mode, and constructing a linked list embedded in the head node, each linked list node in the linked list including a reading offset;

Step 105, determining whether the file includes a reading rule of the file, and when the file includes the reading rule of the file, obtaining, based on the reading rule, times of the reading request of the file and the reading offset corresponding to each time of the reading request, and generating a map route based on the times of the reading request and corresponding reading offsets, and storing the map route in the linked list; and Step 107, executing pre-reading based on the linked list.

Receiving the reading request for the file and determining whether the reading for the file is continuous.

When the reading for the file is discontinuous, the non-sequential pre-reading learning mode is entered to generate the head node list_head of the file mode, and a structural body variable ra_map is defined. In the structural body variable ra_map, the reading offsets and the linked list embedded in the head node are included, and the linked list is connected by the head node. Each linked list node of the linked list includes: the reading offset, the reading offset to be read in the next time, the reading offset read in the last time. It determines whether the file has reading file rules and algorithms that are known. If the file has reading file rules and algorithms that are known, the times of the reading request of the corresponding file and the offset corresponding to each time of the reading request are generated, and according to the times of the reading request of the corresponding file and the offset corresponding to each time of the reading request, the map route is generated. The map route is stored in the linked list, and the pre-reading is executed based on the linked list.

By using the solution of the present disclosure, the pre-reading mechanism of the kernel client is improved, the non-sequential pre-reading of the kernel client is realized, the file reading performance of the kernel client is improved, and various forms of file reading business may be adapted to, and a cache hit rate of non-sequential pre-reading is improved.

In some embodiments, the method further includes:

when the file does not include the reading rule of the file, determining whether to read the file repeatedly, and based on a determination result, obtaining the times of the reading request of the file and the reading offsets corresponding to each time of the reading request, and generating the map route based on the times of the reading request and the reading offset corresponding to each time of the reading request, and storing the map route in the linked list.

In some embodiments, determining whether to read the file repeatedly, and based on the determination result, obtaining the times of the reading request of the file and the reading offset corresponding to each time of the reading request, and generating the map route based on the times of the reading request and the reading offset corresponding to each time of the reading request includes:

in response to reading the file repeatedly, obtaining the times of the reading request of the file and the corresponding reading offsets when the file is read for a first time, and when the file is repeatedly read, based on the times of the reading request, making a difference calculation to the corresponding reading offsets, respectively, and when an error of a calculating result is less than a preset quantity of pages, generating the map route based on that the error of the calculating result is less than a preset quantity of the corresponding reading offsets.

According to a plurality of embodiments of the present disclosure, for a file that needs to be read repeatedly, for example, for the file of 1000 pages, when the file is read for the first time, total times of reading are 5, and the relationship between times of the reading request and reading offset is as follows: the times of the reading request is 1, the reading offset is 200; the times of the reading request is 2, the reading offset is 300; the times of the reading request is 3, the reading offset is 100; the times of the reading request is 1, the reading offset is 100; and the times of the reading request is 1, the reading offset is 400. When the file is repeatedly read again, the reading offsets of the first five times are taken to make a difference with the reading offset in the reading for the first time, respectively. When the absolute value of the difference value is less than a preset quantity of pages, such as 30, the reading offset of the reading request of the time less than 30 is used as the map route for subsequent repeatedly reading the file.

By calculating the times of the reading request and the reading offsets of the file that needs to be repeatedly read, the read rate of the kernel client and the cache hit ratio of the file that needs to be repeatedly read are improved.

In some embodiments, determining whether to read the file repeatedly, and based on the determination result, obtaining the times of the reading request of the file and the reading offset corresponding to each time of the reading request, and generating the map route based on the times of the reading request and the reading offset corresponding to each time of the reading request includes:

when it is not performed repeatedly reading the file, obtaining preset times of the reading request of the file and the reading offset corresponding to each time of the reading request, and based on the preset times of the reading request and the corresponding reading offsets, performing statistical calculation and generating the map route.

In some embodiments, performing the statistical calculation based on the preset times of the reading request and the corresponding reading offsets, and generating the map route includes:
  based on the preset times and the corresponding reading offsets, obtaining an average value of the reading offsets;
  based on an average value of the reading offsets and a size of the file, obtaining requesting times of an unread part of the file; and
  based on the requesting times of the unread part of the file and the average value of the reading offsets, generating the map route.

According to a plurality of embodiments of the present disclosure, for a file that does not need to be read repeatedly, the reading condition in reading the file is counted. For example, for the file of 1000 pages, when the file is read for the first 3 times, the relationship between the times of the reading request and the reading offset is as follows: the times of the reading request is 1, the reading offset is 70; the times of the reading request is 2, the reading offset is 50; the times of the reading request is 3, the reading offset is 60. The average of the reading offsets is calculated to be 60, the size of the unread part of the file is calculated to be 820. The average value of the reading offsets is taken as the reading offset of the unread part of the file, and the remaining times of the reading request are calculated to be 820. Request times 14 and the average value 60 of the reading offsets are regarded as the times of the reading request and the reading offsets of the unread part of the file, and based on this, the map route is generated.

By calculating the times of the reading request and the reading offsets of the file that does not need to be repeatedly read, the read rate of the kernel client and the cache hit ratio of the file that needs to be repeatedly read are improved.

In some embodiments, receiving the reading request for the file and determining whether the reading for the file is continuous further includes: recording discontinuous times of reading the file.

In some embodiments, the reading for the file is discontinuous includes: the discontinuous times reaches preset times.

In some embodiments, each linked list node in the linked list further includes the reading offset to be read in the next time; and
  executing pre-reading based on the linked list includes:
  based on the linked list, reading the reading offset to be read in the next time of the file into a page high-speed cache to execute pre-reading a file that is not read sequentially.

Figure 2:
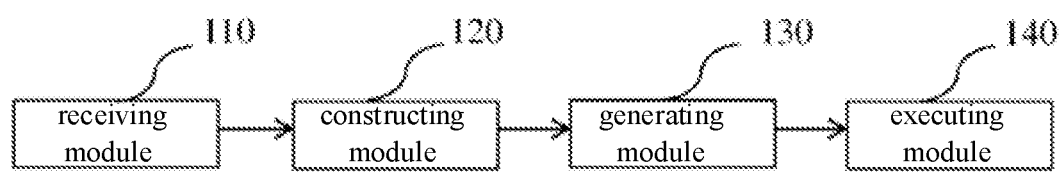
FIG. 2 is a schematic diagram of a system for reading a kernel client according to an embodiment of the present disclosure.

On the basis of the same inventive concept, according to another aspect of the present disclosure, as shown in FIG. 2, the embodiments of the present disclosure further provide a system for pre-reading a kernel client, including:
  a receiving module 110 configured for receiving a reading request for a file and determining whether reading for the file is continuous;
  a constructing module 120 configured for, when the reading for the file is discontinuous, generating a head node of a file mode, and constructing a linked list embedded in the head node, each linked list node in the linked list including a reading offset;
  a generating module 130 configured for determining whether the file includes a reading rule of the file, and when the file includes the reading rule of the file, obtaining, based on the reading rule, times of the reading request of the file and the reading offset corresponding to each time of the reading request, and generating a map route based on the times of the reading request and corresponding reading offsets, and storing the map route in the linked list; and
  an executing module 140 configured for executing pre-reading based on the linked list.

In some embodiments, the system further includes a second generating module configured for:
  when the file does not include the reading rule of the file, determining whether to read the file repeatedly, and based on a determination result, obtaining the times of the reading request of the file and the reading offsets corresponding to each time of the reading request, and generating the map route based on the times of the reading request and the reading offset corresponding to each time of the reading request, and storing the map route in the linked list.

In some embodiments, determining whether to read the file repeatedly, and based on the determination result, obtaining the times of the reading request of the file and the reading offset corresponding to each time of the reading request, and generating the map route based on the times of the reading request and the reading offset corresponding to each time of the reading request includes:
  in response to reading the file repeatedly, obtaining the times of the reading request of the file and the corresponding reading offsets when the file is read for a first time, and when the file is repeatedly read, based on the times of the reading request, making a difference calculation to the corresponding reading offsets, respectively, and when an error of a calculating result is less than a preset quantity of pages, generating the map route based on that the error of the calculating result is less than a preset quantity of the corresponding reading offsets.

In some embodiments, determining whether to read the file repeatedly, and based on the determination result, obtaining the times of the reading request of the file and the reading offset corresponding to each time of the reading request, and generating the map route based on the times of the reading request and the reading offset corresponding to each time of the reading request includes:
  when it is not performed repeatedly reading the file, obtaining preset times of the reading request of the file and the reading offset corresponding to each time of the reading request, and based on the preset times of the reading request and the corresponding reading offsets, performing statistical calculation and generating the map route.

In some embodiments, performing the statistical calculation based on the preset times of the reading request and the corresponding reading offsets, and generating the map route includes:
  based on the preset times and the corresponding reading offsets, obtaining an average value of the reading offsets;
  based on an average value of the reading offsets and a size of the file, obtaining requesting times of an unread part of the file; and
  based on the requesting times of the unread part of the file and the average value of the reading offsets, generating the map route.

In some embodiments, receiving the reading request for the file and determining whether the reading for the file is continuous further includes: recording discontinuous times of reading the file.

In some embodiments, the reading for the file is discontinuous includes: the discontinuous times reaches preset times.

In some embodiments, each linked list node in the linked list further includes the reading offset to be read in the next time; and executing pre-reading based on the linked list includes: based on the linked list, reading the reading offset to be read in the next time of the file into a page high-speed cache to execute pre-reading a file that is not read sequentially.

Figure 3:
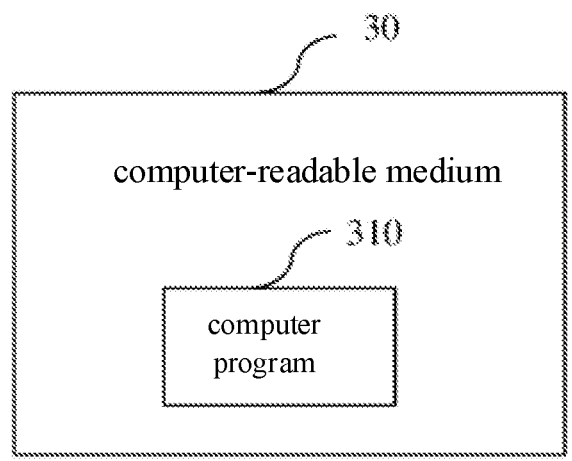
FIG. 3 is a schematic structural diagram of a computer-readable storage medium according to an embodiment of the present disclosure.

On the basis of the same inventive concept, according to another aspect of the present disclosure, as shown in FIG. 3, the embodiments of the present disclosure further provide a computer-readable storage medium 30 storing a computer program 310, wherein the computer program 310, when executed by a processor, implements the steps of the method as follows.

receiving a reading request for a file and determining whether reading for the file is continuous;

when the reading for the file is discontinuous, generating a head node of a file mode, and constructing a linked list embedded in the head node, each linked list node in the linked list including a reading offset;

determining whether the file includes a reading rule of the file, and when the file includes the reading rule of the file, obtaining, based on the reading rule, times of the reading request of the file and the reading offset corresponding to each time of the reading request, and generating a map route based on the times of the reading request and corresponding reading offsets, and storing the map route in the linked list; and executing pre-reading based on the linked list.

In some embodiments, the method further includes:

when the file does not include the reading rule of the file, determining whether to read the file repeatedly, and based on a determination result, obtaining the times of the reading request of the file and the reading offsets corresponding to each time of the reading request, and generating the map route based on the times of the reading request and the reading offset corresponding to each time of the reading request, and storing the map route in the linked list.

In some embodiments, determining whether to read the file repeatedly, and based on the determination result, obtaining the times of the reading request of the file and the reading offset corresponding to each time of the reading request, and generating the map route based on the times of the reading request and the reading offset corresponding to each time of the reading request includes:

in response to reading the file repeatedly, obtaining the times of the reading request of the file and the corresponding reading offsets when the file is read for a first time, and when the file is repeatedly read, based on the times of the reading request, making a difference calculation to the corresponding reading offsets, respectively, and when an error of a calculating result is less than a preset quantity of pages, generating the map route based on that the error of the calculating result is less than a preset quantity of the corresponding reading offsets.

In some embodiments, determining whether to read the file repeatedly, and based on the determination result, obtaining the times of the reading request of the file and the reading offset corresponding to each time of the reading request, and generating the map route based on the times of the reading request and the reading offset corresponding to each time of the reading request includes:

when it is not performed repeatedly reading the file, obtaining preset times of the reading request of the file and the reading offset corresponding to each time of the reading request, and based on the preset times of the reading request and the corresponding reading offsets, performing statistical calculation and generating the map route.

In some embodiments, performing the statistical calculation based on the preset times of the reading request and the corresponding reading offsets, and generating the map route includes:

based on the preset times and the corresponding reading offsets, obtaining an average value of the reading offsets;

based on an average value of the reading offsets and a size of the file, obtaining requesting times of an unread part of the file; and based on the requesting times of the unread part of the file and the average value of the reading offsets, generating the map route.

In some embodiments, receiving the reading request for the file and determining whether the reading for the file is continuous further includes: recording discontinuous times of reading the file.

In some embodiments, the reading for the file is discontinuous includes: the discontinuous times reaches preset times.

In some embodiments, each linked list node in the linked list further includes the reading offset to be read in the next time; and executing pre-reading based on the linked list includes: based on the linked list, reading the reading offset to be read in the next time of the file into a page high-speed cache to execute pre-reading a file that is not read sequentially.

Finally, it should be noted that a person skilled in the art may understand all or a part of the process of implementing the method in the embodiment above, which may be completed by using computer programs to instruct related hardware. The programs may be stored in a computer-readable storage medium. When the computer-readable instructions are executed, the processes of the embodiments of the methods may be included. Wherein the storage media may be disk, disc, read-only memory (ROM) or random memory (RAM). The above embodiments of the computer programs may achieve the same or similar effects as any of the corresponding method embodiments.

The above is an exemplary embodiment of the present disclosure, but it should be noted that various changes and modifications may be made without deviating from the scope disclosed by the embodiments of present disclosure, which is limited by the claim. The functions, steps and/or actions of the method claims according to the embodiment disclosed described here do not need to be performed in any particular order. In addition, although the elements disclosed in the embodiments of the present disclosure may be described or required in an individual form, they may be understood as multiple unless explicitly limited to singular.

It should be understood that what is used herein, unless the context clearly supports exceptions, the singular form 'one' is intended to also include the plural form. It should also be understood that the 'and/or' used herein refers to any and all possible combinations of items that include one or more items listed in association.

That the above-mentioned embodiments of the present disclosure disclose the serial number of the embodiments is only for description, not for the merits of the embodiments.

A person skilled in the art may understand that all or some of the steps for implementing the above embodiments may be completed by hardware, and may also be completed by using a program to instruct relevant hardware. The program may be stored in a computer-readable storage medium. The above-mentioned storage medium may be a read-only memory, a magnetic disk, an optical disk and so on.

A person skilled in the art should understand that the discussion on any of the above embodiments is merely illustrative, and are not intended to imply that the scope (including the claims) of the embodiments of the present disclosure is limited to those examples. With the concept of the embodiments of the present disclosure, the embodiments or the technical features of different embodiments may be combined, and many other variations of different aspects of the embodiments of the present disclosure as stated above may exist, which are not provided in detail for brevity. Therefore, any omissions, modifications, equivalent substitutions and improvements that are made within the spirit and the principle of the embodiments of the present disclosure should fall within the protection scope of the embodiments of the present disclosure.

The invention claimed is:

1. A method for pre-reading a kernel client, comprising:
receiving a reading request for a file and determining whether reading for the file is continuous;
when the reading for the file is discontinuous, generating a head node of a file inode, and constructing a linked list embedded in the head node, each linked list node in the linked list comprising a reading offset;
determining whether the file comprises a reading rule of the file, and when the file comprises the reading rule of the file, obtaining, based on the reading rule, times of the reading request of the file and the reading offset corresponding to each time of the reading request, and generating a map route based on the times of the reading request and corresponding reading offsets, and storing the map route in the linked list; and
executing pre-reading based on the linked list.

2. The method according to claim 1, wherein the method further comprises:
when the file does not comprise the reading rule of the file, determining whether to read the file repeatedly, and based on a determination result, obtaining the times of the reading request of the file and the reading offset corresponding to each time of the reading request, and generating the map route based on the times of the reading request and the reading offset corresponding to each time of the reading request, and storing the map route in the linked list.

3. The method according to claim 2, wherein determining whether to read the file repeatedly, and based on the determination result, obtaining the times of the reading request of the file and the reading offset corresponding to each time of the reading request, and generating the map route based on the times of the reading request and the reading offset corresponding to each time of the reading request comprises:
in response to reading the file repeatedly, obtaining the times of the reading request of the file and the corresponding reading offsets when the file is read for a first time, and when the file is repeatedly read, based on the times of the reading request, making a difference calculation to the corresponding reading offsets, respectively, and when an error of a calculating result is less than a preset quantity of pages, generating the map route based on that the error of the calculating result is less than a preset quantity of the corresponding reading offsets.

4. The method according to claim 3, wherein based on the times of the reading request, making the difference calculation to the corresponding reading offsets comprises:
based on the times of the reading request, making a difference calculation to the corresponding reading offsets in repeatedly reading the file and the corresponding reading offsets in reading the file for the first time; and
the error of the calculating result is an absolute value of a difference value of the corresponding reading offsets in repeatedly reading the file and the corresponding reading offsets in reading the file for the first time.

5. The method according to claim 2, wherein determining whether to read the file repeatedly, and based on the determination result, obtaining the times of the reading request of the file and the reading offset corresponding to each time of the reading request, and generating the map route based on the times of the reading request and the reading offset corresponding to each time of the reading request comprises:
when it is not performed repeatedly reading the file, obtaining preset times of the reading request of the file and the reading offset corresponding to each time of the reading request, and based on the preset times of the reading request and the corresponding reading offsets, performing statistical calculation and generating the map route.

6. The method according to claim 5, wherein performing the statistical calculation based on the preset times of the reading request and the corresponding reading offsets, and generating the map route comprises:
calculating an average value of the reading offsets and a size of an unread part of the file, and obtaining remaining times of the reading request by dividing the size of the unread part of the file by the average value of the reading offsets, and regarding the remaining times of the reading request and the average value of the reading offsets as the times of the reading request and the reading offsets of the unread part of the file, and generating the map route.

7. The method according to claim 5, wherein performing the statistical calculation based on the preset times of the reading request and the corresponding reading offsets, and generating the map route comprises:
based on the preset times and the corresponding reading offsets, obtaining an average value of the reading offsets;
based on an average value of the reading offsets and a size of the file, obtaining requesting times of an unread part of the file; and
based on the requesting times of the unread part of the file and the average value of the reading offsets, generating the map route.

8. The method according to claim 1, wherein receiving the reading request for the file and determining whether the reading for the file is continuous further comprises:
recording discontinuous times of reading the file.

9. The method according to claim 8, wherein the reading for the file is discontinuous comprises: the discontinuous times reaches preset times.

10. The method according to claim 1, wherein each linked list node in the linked list further includes the reading offset to be read in the next time; and executing pre-reading based on the linked list comprises:
based on the linked list, reading the reading offset to be read in the next time of the file into a page high-speed cache to execute pre-reading a file that is not read sequentially.

11. A computer-readable storage medium storing a computer program, wherein the computer program, when executed by a processor, implements the steps of the method according to claim 1.

12. The method according to claim 1, wherein when the reading for the file is discontinuous, the non-sequential pre-reading learning mode is entered to generate the head node of the file inode, and a structural body variable is defined.

13. The method according to claim 12, wherein the structural body variable comprises the reading offsets and the linked list embedded in the head node.

14. The computer-readable storage medium according to claim 11, wherein the method further comprises:
when the file does not comprise the reading rule of the file, determining whether to read the file repeatedly, and based on a determination result, obtaining the times of the reading request of the file and the reading offset corresponding to each time of the reading request, and generating the map route based on the times of the reading request and the reading offset corresponding to each time of the reading request, and storing the map route in the linked list.

15. The computer-readable storage medium according to claim 14, wherein determining whether to read the file repeatedly, and based on the determination result, obtaining the times of the reading request of the file and the reading offset corresponding to each time of the reading request, and generating the map route based on the times of the reading request and the reading offset corresponding to each time of the reading request comprises:
in response to reading the file repeatedly, obtaining the times of the reading request of the file and the corresponding reading offsets when the file is read for a first time, and when the file is repeatedly read, based on the times of the reading request, making a difference calculation to the corresponding reading offsets, respectively, and when an error of a calculating result is less than a preset quantity of pages, generating the map route based on that the error of the calculating result is less than a preset quantity of the corresponding reading offsets.

16. The computer-readable storage medium according to claim 15, wherein based on the times of the reading request, making the difference calculation to the corresponding reading offsets comprises:
based on the times of the reading request, making a difference calculation to the corresponding reading offsets in repeatedly reading the file and the corresponding reading offsets in reading the file for the first time; and
the error of the calculating result is an absolute value of a difference value of the corresponding reading offsets in repeatedly reading the file and the corresponding reading offsets in reading the file for the first time.

17. The computer-readable storage medium according to claim 14, wherein determining whether to read the file repeatedly, and based on the determination result, obtaining the times of the reading request of the file and the reading offset corresponding to each time of the reading request, and generating the map route based on the times of the reading request and the reading offset corresponding to each time of the reading request comprises:
when it is not performed repeatedly reading the file, obtaining preset times of the reading request of the file and the reading offset corresponding to each time of the reading request, and based on the preset times of the reading request and the corresponding reading offsets, performing statistical calculation and generating the map route.

18. The computer-readable storage medium according to claim 17, wherein performing the statistical calculation based on the preset times of the reading request and the corresponding reading offsets, and generating the map route comprises:
calculating an average value of the reading offsets and a size of an unread part of the file, and obtaining remaining times of the reading request by dividing the size of the unread part of the file by the average value of the reading offsets, and regarding the remaining times of the reading request and the average value of the reading offsets as the times of the reading request and the reading offsets of the unread part of the file, and generating the map route.

19. The computer-readable storage medium according to claim 17, wherein performing the statistical calculation based on the preset times of the reading request and the corresponding reading offsets, and generating the map route comprises:
based on the preset times and the corresponding reading offsets, obtaining an average value of the reading offsets;
based on an average value of the reading offsets and a size of the file, obtaining requesting times of an unread part of the file; and
based on the requesting times of the unread part of the file and the average value of the reading offsets, generating the map route.

20. The computer-readable storage medium according to claim 11, wherein receiving the reading request for the file and determining whether the reading for the file is continuous further comprises: recording discontinuous times of reading the file.

* * * * *